March 27, 1945.    O. R. SOMMERMEYER, JR    2,372,530
GAS ANALYSIS APPARATUS
Filed March 3, 1943    3 Sheets-Sheet 1

Inventor
OSCAR R. SOMMERMEYER, JR.
By Martin E. Anderson
Attorney

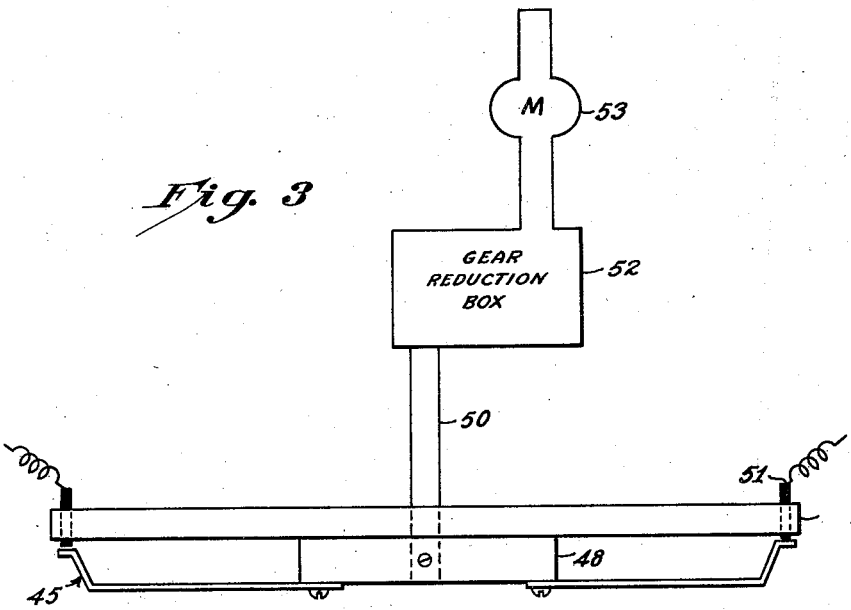
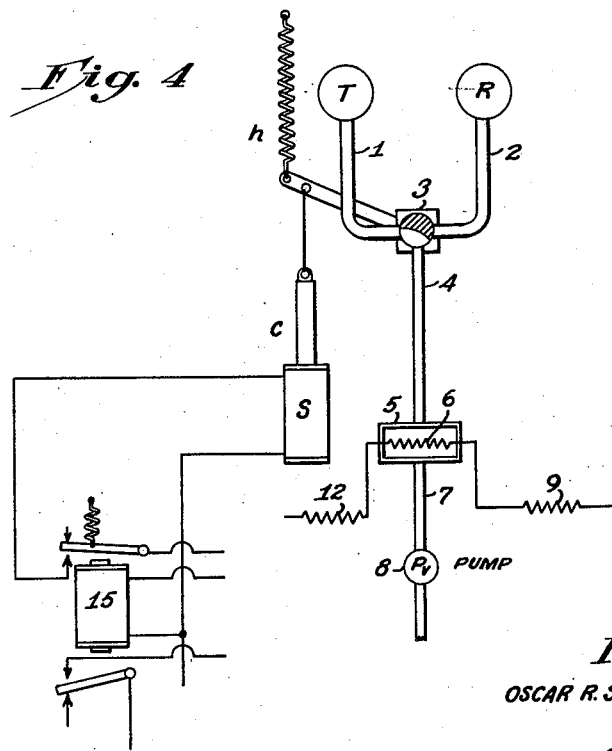

Patented Mar. 27, 1945

2,372,530

UNITED STATES PATENT OFFICE 2,372,530

GAS ANALYSIS APPARATUS

Oscar R. Sommermeyer, Jr., Passaic, N. J.

Application March 3, 1943, Serial No. 477,900

8 Claims. (Cl. 73—27)

My invention relates to devices employing bridge network, or null-network, arrangements for indication or control, and relates in particular to continuous gas analysis apparatus of the thermal conductivity type.

Prior to my invention the sensitivity, reliability, and accuracy of gas analysis apparatus of the continuous thermal conductivity or catalytic-combustion type has been limited due to the occurrence of variations in the circuit which obscure or invalidate changes attributable to the gas under analysis. For example, in the well known combustible gas indicator of the Wheatstone bridge type, the catalytic filament which forms a portion of the bridge can cause a false indication by virtue of the fact that it loses volume due to molecular evaporation and reflects this change in its resistance. In continuous operation this effect is cumulative and becomes more detrimental to proper operation as the sensitivity of the apparatus is increased. A few of the many other factors adversely affecting operation are changes in ambient temperature, changes in supply voltage and changes in the pressure of the gas. It is, accordingly, an object of my invention to automatically correct for those undesirable factors, regardless of their nature, which manifest themselves by unbalancing the measuring network, and thereby extend the allowable sensitivity, reliability, accuracy and utility of this class of device.

Through the use of my invention accurate continuous gas analysis apparatus of the thermal conductivity type can be constructed with a sensitivity sufficient to indicate quantitative changes in oxygen-nitrogen mixtures such as air.

It is an additional object of my invention to make more precise measurements possible in automatic devices employing a null-network and a reference standard. It is a feature of my invention that the reference standard may be changed without manual adjustments, thus expediting the comparison of gases in a gas analysis apparatus. This principle may be extended into the field of measurements in general, and applied beneficially wherever uncontrollable variables affect the accuracy of comparison in automatic systems.

In the case of a continuous gas analysis apparatus of the thermal conductivity type, the manner in which the effects of undesirable factors are removed is briefly as follows: The atmosphere being analyzed is removed from the active element and the atmosphere to which the device was initially adjusted is re-introduced to the active element. Any unbalance of the network is then due entirely to undesirable factors, and an electrical system operating in time sequence is then made to reset the network to balance, using the output due to unbalance as the control for the direction and degree of correction to be applied. The correction applied to the network is in the form of shunt resistance which is connected by electrically or mechanically self-locking circuits to a leg of the network.

In one form of my invention, using alternating current bridge power, a phase responsive circuit determines the direction of network unbalance and by actuating a relay in response to an unbalance in one direction serves to switch the independently determined correction resistance in shunt with the proper network leg to re-establish balance.

The values of correction resistance are determined, selected and connected by an amplitude responsive system comprising an electron tube of the thyraton type, a number of relays actuated by this tube's plate current and, a corresponding number of voltage dividers connected to the control element of this type. Due to the unique circuit arrangement, a single tube is made to perform the work of selecting all the correction resistors regardless of the wide variation in voltage levels this involves or the number of correction resistors employed.

In the described and illustrated arrangement, the correction resistors are of the pre-set type and are connected to the network one at a time. The correction thus obtained is immediately reflected by a lowering of the bridge unbalance voltage and consequently, the amount of correction needed becomes progressively smaller as additional resistors are keyed in. By using resistors of progressively smaller correction ability it is possible to correct the bridge network to a higher degree of balance than is detectable by observation of the indicating meter, provided that the network unbalance voltage applied to the correction circuits is amplified to a higher degree than that applied to the indicating meter. It is interesting to note that the term "balance" as applies to null-networks or bridge circuits is entirely dependent on the sensitivity of the null detector. The relationship between the network leg being shunted to re-establish balance and the resistance value or values used in shunt is expressed by the fundamental law for parallel connected resistors which is:

$$\frac{1}{R} = \frac{1}{R_1} + \frac{1}{R_2} + \frac{1}{R_3} + \frac{1}{R_4} + \frac{1}{R_5} + \frac{1}{R_6} + \frac{1}{R_7}, \text{ etc.}$$

From inspection of this formula it can be seen that the network resistor being shunted can be lowered in effective value to any of a large number of values without the use of a correspondingly large number of shunt resistors; this is accomplished by simply using different parallel combinations of the several resistors.

Having thus described the invention in a general way and stated the objects thereof, the in- vention will now be described in greater detail, and for this purpose reference will be had to the accompanying drawings in which the invention has been illustrated, and in which:

Figure 3 is a side view of the switching mechanism; and

Figure 4 is a diagram disclosing the cooperation between the three-way valve and its electrical actuating means.

Figure 1:
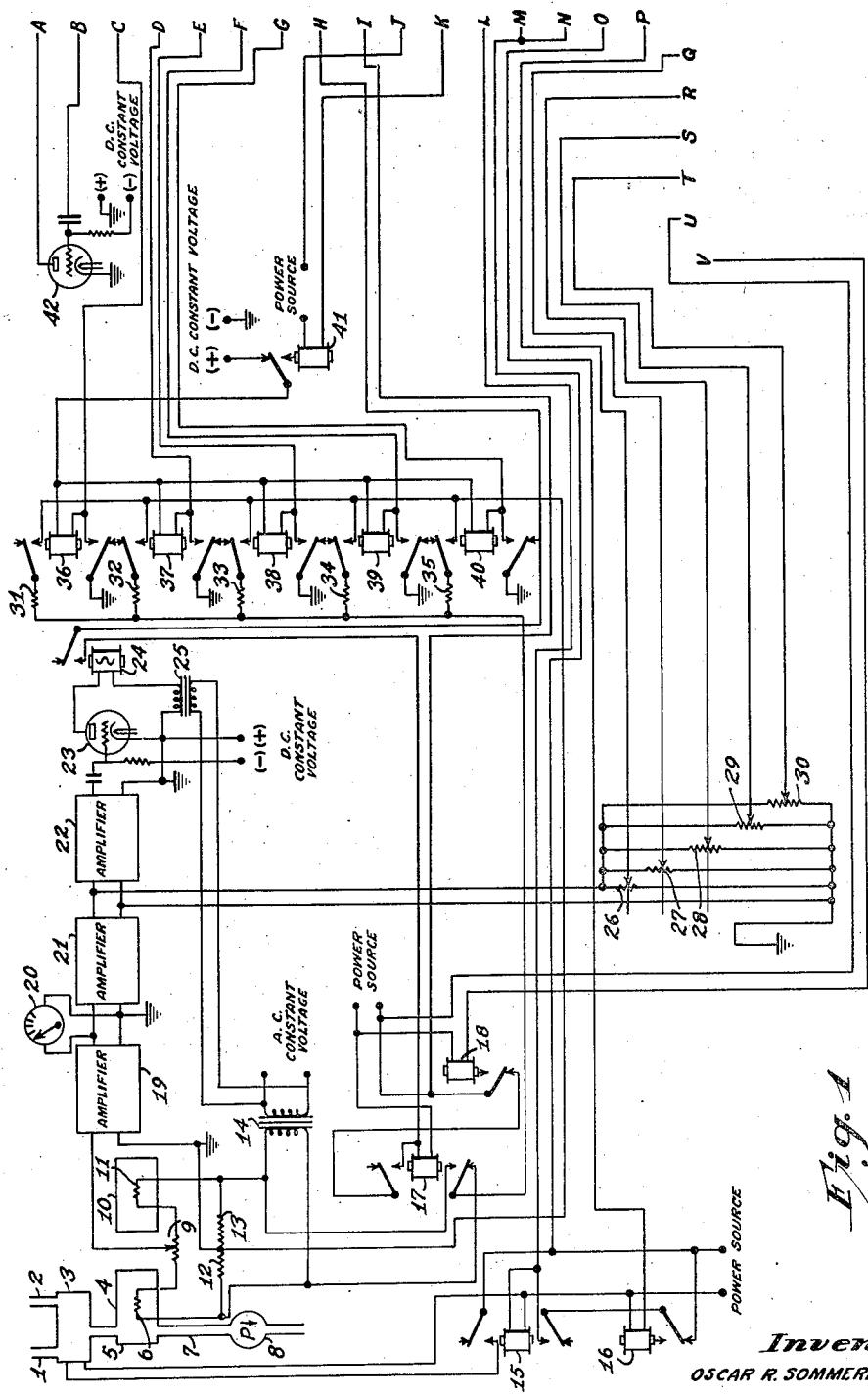
Figure 1 shows a schematic diagram of the invention.
Figure 2:
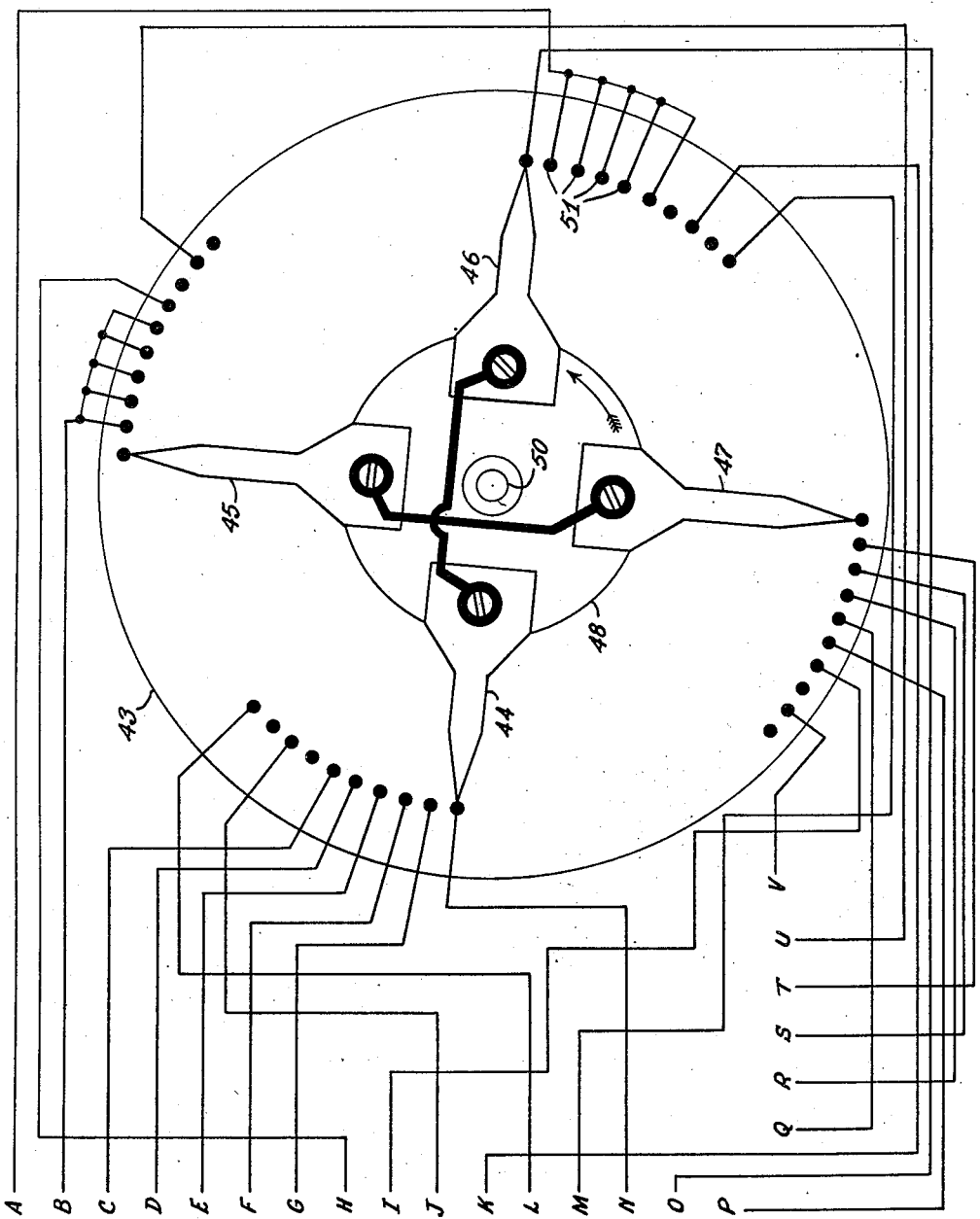
Figure 2 is a diagrammatic representation showing the relative position of the stationary and rotary switch elements and the motor drive therefor.

Referring to Figures 1 and 2, the detailed operation of one version of my invention is as follows:

Metallic elements 6 and 11, together with resistors 12 and 13 form a Wheatstone bridge which can be manually balanced by potentiometer 9. The bridge receives power from an alternating current source of voltage by means of transformer 14 which reduces the voltage to a value which will operate the elements 6 and 11 at the desired temperature. A chamber cell 5 which houses the active element 6 is connected by a short tube line 4 to an electrically actuated three-way-valve 3 which permits selection of either the doubtful gas conducted through tube line 1 or the reference gas conducted through tube line 2. The chamber 10 houses the inactive element 11. A pump 8, connected with cell 5 by a tube line 7, produces a negative pressure at the outlet of the chamber 5 and thus causes a continuous flow of gas to the chamber. When analyzing a gas mixture the output of the bridge 6, 9, 11, 12, and 13 is connected to an amplifier 19 which increases the sensitivity of the system to small deviations in the sampled gas. The indicating meter 20 shows the relative change in a gas mixture should such change occur.

When re-balancing the apparatus to the reference gas, a second amplifier 21 amplifies the bridge output to a still higher level which is then made to determine the value of the correction resistance (parallel combinations of resistors 31, 32, 33, 34, and 35) by its controlling action on the grid of tube 42 which is preferably a thyratron. Tube 42 when receiving a voltage of sufficiently high value from amplifier 21 conducts current and closes the correction relay in its plate circuit at that time. The correction relays 36, 37, 38, 39, and 40 are arranged so as to lock themselves closed, if they are momentarily energized by the current conducted through tube 42. One or more of the correction resistors 31, 32, 33, 34, and 35 thus remain connected to a bridge leg 12 or 13 after the controlling voltage used to place them in the circuit is removed. The potentiometers 26, 27, 28, 29, and 30 are used to control the percentage of the unbalance voltage amplified by amplifier 21 which is applied to tube 42. A potentiometer, say 26, the value of the corresponding correction resistor 31, and the amplified bridge unbalance voltage from amplifier 21 which is necessary to make tube 42 close relay 36 are adjusted in relation. It is this relationship which is made to determine if a correction resistor of a certain value shall or shall not be connected to a bridge leg.

The output of amplifier 21 is still further amplified by amplifier 22 before application to the phase determining circuit comprising tube 23, which is preferably a thyratron, relay 24 and transformer 25. The voltage applied to the bridge 6, 9, 11, 12, and 13 through transformer 14 and the voltage applied to the plate circuit of tube 23 from transformer 25 are obtained from the same power source to maintain a definite phase relationship. The amplified voltage applied to the control element of tube 23 is derived from the bridge and a complete 180 degree phase reversal of this voltage takes place when the bridge unbalance shifts to the opposite side of the null point. With the bridge adjusted so that the amplified voltage applied to the grid of tube 23 is out of phase with the plate voltage of tube 23, no plate current will flow, and the relays 24 and 17 will remain open. If the correction circuits should insert resistance it will be then inserted in shunt with that bridge leg 12, which will bring the bridge back to balance. Should the amplified unbalance voltage and the plate voltage applied to tube 23 be in phase, tube 23 will conduct closing relays 24 and 17 which will switch the subsequent correction resistance in shunt with the other ratio leg 13, thus bringing the bridge back to balance.

It is the purpose of the timing switch mechanism (Fig. 2) 43, 44, 45, 46, 47, 48, 50, 51, 52, and 53, to co-ordinate the functioning of all the component parts in such a manner, that a regularly recurring cycle of operation results, starting with the normal analysis operation, going through all the steps of rebalance and then back to the analysis operation.

The normal analysis operation takes place when the contact arms 44, 45, 46, and 47 are moving counterclockwise through the sectors of contact assembly 43 devoid of contact points. Upon contacting the first set of contact points, relay 15 is energized closing the circuit to solenoid S whereby the core C is attracted thereby moving valve 3 to conduct the reference gas from R into the chamber 5, housing the active element 6. Since relay 15 is connected so as to electrically lock itself, the valve continues to conduct the reference gas to the chamber 5, as the contact arms rotate to the succeeding contact points.

The second set of contact points when contacted by the moving arms, momentarily energize relay 16 which breaks the electrical lock circuit of relay 17 to make it responsive to a subsequent pulse, if delivered.

The third set of contacts momentarily energize relay 41, causing it to momentarily open the electrical circuit energizing the correction relays 36, 37, 38, 39, and 40. In this manner the electrical locks of any or all of these relays is opened and they are ready to respond to the subsequently impressed control voltage.

The fourth set of contacts then momentarily energize relay 17, if the amplified unbalance voltage of the bridge is of such phase as to have closed relay 24. Relay 17 remains electrically locked if energized thus.

The fifth set of contact points switch in the first correction step, by simultaneously applying amplified unbalance bridge voltage to the grid circuit and direct current voltage to the plate of tube 42. Should the amplified unbalance bridge voltage be high enough to cause tube 42 to conduct, relay 36 will close and electrically lock itself while at the same time connecting correction resistor 31, in shunt with a bridge leg so as to partially rebalance the bridge.

The sixth set of contact points switch in the second correction step, comprising relay 37, correction resistor 32, and potentiometer 27. This correction step functions in the same manner as the preceding one. In like manner, the seventh, eighth and ninth sets of contacts, switch in correction steps three, four, and five respectively. The difference in these correction steps is only in the degree of bridge balance their respective resistors are able to affect.

The tenth and last set of contacts momentarily energize relay 16 which breaks the electrical lock of relay 15, thereby opening the circuit to solenoid S and allowing spring $h$ to restore valve 3 to the position shown in Figure 4, which allows the gas being analyzed to pass into chamber 5 and contact the active element 6.

My invention may take a number of forms and may be combined and modified without departing from the spirit of the arrangement covered by the claims.

It is evident that the resistance elements 31 and 35 may be connected in parallel with one network leg when the network is adjusted and removed one by one to re-establish the balance instead of added.

The use of direct current instead of alternating current for operating several of the circuits is considered as being within the scope of the invention. The term "network" is meant to include potentiometer circuits as well as bridge circuits whether they contain reactive, partially reactive, or resistive branches.

Having thus described my invention in one specific arrangement, that which I claim as new and for which I desire to secure Letters Patent is:

1. A gas comparison apparatus arranged for cyclic operation, comprising a metering network of the Wheatstone bridge type, the resistance in each of two network legs forming one element of a cell, the cell in one leg containing a reference gas, the other having associated therewith means for alternately flowing reference gas and a test gas therethrough, each of the other two network legs having a resistance, a plurality of separate resistance elements arranged for parallel interconnection with one network leg, an alternating current supply for the network, and means responsive to the degree and the phase of the bridge unbalance for changing the resistance of one network leg by varying the number of said separate resistance elements in parallel with the network leg until a balance is effected.

2. A gas comparison apparatus arranged for cyclic operations, comprising a metering network of the Wheatstone bridge type, the resistance in each of two network legs forming one element of a cell, the ceell in one leg containing a reference gas, the other having associated therewith means for alternately flowing reference gas and a test gas therethrough, each of the other two network legs having a resistance, an alternating current supply for the network, a plurality of separate resistance elements, and means responsive to the degree and the phase of the bridge unbalance for connecting and retaining said separate resistance elements in parallel with the high resistance leg until a balance is effected.

3. A gas comparison apparatus arranged for cyclic operation, comprising a metering network of the Wheatstone bridge type, the resistance in each of two network legs forming one element of a cell, the cell in one leg containing a reference gas, the other having associated therewith means for alternately flowing reference gas and a test gas therethrough, each of the other two network legs having a resistance, one of which is adjustable, an alternating current supply for the network, a plurality of separate resistance elements for inclusion in parallel in the adjustable leg, means responsive to the degree and the phase of the bridge unbalance for effecting a variation in the number of said separate resistance elements in parallel with the adjustable resistance leg until a balance is effected, and means for reestablishing the normal resistance of the leg.

4. A gas comparison apparatus arranged for cyclic operation, comprising a metering network of the Wheatstone bridge type, the resistance in each of two network legs forming one element of a cell, the cell in one leg containing a reference gas, the other having associated therewith means for alternately flowing reference gas and a test gas therethrough, each of the other two network legs having a resistance, an alternating current supply for the network, a plurality of separate resistance elements, means responsive to the degree and the phase of the bridge unbalance for connecting and retaining one or more of said separate resistance elements in parallel with the high resistance leg until a balance is effected, and means for simultaneously disconnecting the separate resistance elements from the bridge leg and from each other once during each test cycle.

5. A gas comparison apparatus arranged for cyclic operation, comprising a metering network of the Wheastone bridge type, the resistance in each of two network legs forming one element of a cell, the cell in one leg containing a reference gas, the other having associated therewith means for alternately flowing reference gas and a test gas therethrough, the other two network legs having each a resistance, an alternating current supply for the network, a plurality of separate resistance elements, means comprising a phase responsive electronic device operatively connected with the bridge for automatically selecting the leg of greater resistance, and means comprising a second electronic device responsive to the degree of unbalance, for connecting and retaining one or more of said separate resistance elements in parallel with the high resistance leg until a balance is effected.

6. A gas comparison apparatus arranged for cyclic operation, comprising a metering network of the Wheatstone bridge type, the resistance in each of two network legs forming one element of a cell, the cell in one leg containing a reference gas, the other having associated therewith means for alternately flowing reference gas and a test gas therethrough, each of the other two network legs having a resistance, an alternating current supply for the network, a plurality of separate resistance elements, means comprising a phase responsive electronic device operatively connected with the bridge, for automatically selecting the leg of greater resistance, means comprising a second electronic device responsive to the degree of unbalance for connecting and retaining one or more of said separate resistance elements in parallel with the high resistance leg until a balance is effected, and means operative once each cycle for simultaneously disconnecting the resistance elements from the bridge leg and from each other.

7. In a gas comparison apparatus of the null-network type arranged for cyclic operation, including a Wheatstone bridge in one branch of which are connected in series two cells containing each a resistor element, one cell in each leg, the other two legs having resistor elements, one of the cells containing a reference gas, means for flowing a test gas through the other cell and for alternately therewith flowing reference gas therethrough, means for applying to the junction points of the network an alternating current potential for producing a current flow in the two branches, a current detector connecting the junction points between the resistances in the opposite branch, a plurality of separate resistance elements arranged for parallel connection, means comprising a phase responsive device for selecting the leg of the network to be corrected to effect a balance, means responsive to the amplitude of the unbalance current and a locking relay operatively associated with each of said separate resistance elements for varying the resistance of the network leg selected by the phase responsive device by steps equal to the reciprocals of the resistance values of the said separate resistance elements until a balance is effected, and means for restoring the resistance of the network leg to normal once during each cycle.

8. A null-network circuit for use in comparing test gases to a reference gas, comprising in combination, a metering network of the Wheatstone bridge type having a resistance in each leg, a source of alternating current connected with the network terminals, two of the resistances being each enclosed in a separate cell, a reference gas in one cell, a supply of reference gas and a supply of gas to be tested connected with the other cell, a suction pump connected with the last named cell, means comprising a three-way valve for alternately communicating the interior of the last mentioned cell with both gas supplies, a switch having a plurality of stationary elements and a cooperating rotating element, electro-magnetic means for controlling the operation of the three-way valve to flow reference gas and test alternately through the cell, said last named means comprising the above mentioned switch and two relays operatively connected with the three-way valve and with the switch for effecting a cyclic operation of the three-way valve, a plurality of separate resistance elements, means comprising a phase responsive electronic device operatively connected with the bridge for automatically selecting the leg of greater resistance, means comprising a second electronic device responsive to the degree of unbalance for connecting and retaining one or more of said separate resistance elements in parallel with the high resistance leg until a balance is effected, and means for simultaneously disconnecting the said separate resistance elements after balance has been effected.

OSCAR R. SOMMERMEYER, JR.